(12) United States Patent
Nabeyama et al.

(10) Patent No.: US 7,450,844 B2
(45) Date of Patent: Nov. 11, 2008

(54) WDM OPTICAL TRANSMISSION EQUIPMENT WITH REDUNDANT CONFIGURATION, AND WAVELENGTH CONTROL METHOD OF LIGHT OUTPUT IN STANDBY SYSTEM

(75) Inventors: Yoshio Nabeyama, Yokohama (JP); Kenji Ohta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 550 days.

(21) Appl. No.: 10/995,788

(22) Filed: Nov. 22, 2004

(65) Prior Publication Data

US 2006/0024058 A1    Feb. 2, 2006

(30) Foreign Application Priority Data

Jul. 29, 2004    (JP) .............................. 2004-221849

(51) Int. Cl.
*H04B 10/04* (2006.01)
*H04B 10/08* (2006.01)

(52) U.S. Cl. ..................... 398/7; 398/5; 398/9; 398/23; 398/34; 398/79; 398/91; 398/94; 398/95

(58) Field of Classification Search ..................... 398/2, 398/5, 7, 9, 23, 31, 43, 59, 79–88, 182, 200, 398/34, 91–95, 151; 372/32; 359/341, 341.33
See application file for complete search history.

(56) References Cited

U.S. PATENT DOCUMENTS

| | | | | |
|---|---|---|---|---|
| 5,764,405 A | * | 6/1998 | Alphonsus | 359/341.33 |
| 5,777,761 A | * | 7/1998 | Fee | 398/7 |
| 5,949,562 A | * | 9/1999 | Kubota et al. | 398/79 |
| 6,172,782 B1 | * | 1/2001 | Kobayashi | 398/9 |
| 6,456,407 B1 | * | 9/2002 | Tammela et al. | 398/59 |
| 6,915,075 B1 | * | 7/2005 | Oberg et al. | 398/9 |
| 7,212,738 B1 | * | 5/2007 | Wang | 398/2 |
| 2002/0145778 A1 | * | 10/2002 | Strasser et al. | 359/124 |
| 2003/0108072 A1 | * | 6/2003 | Hedin | 372/32 |

FOREIGN PATENT DOCUMENTS

| JP | 08-191270 | 7/1996 |
|---|---|---|
| JP | 2003-298524 | 10/2003 |

* cited by examiner

*Primary Examiner*—Kenneth Vanderpuye
*Assistant Examiner*—Li Liu
(74) *Attorney, Agent, or Firm*—Katten Muchin Rosenman LLP

(57) ABSTRACT

WDM optical tranmsmission equipment with redundant configuration includes a plurality of tranmitters. Each tranmitter includes active and standby panels including active and standby optical transmission circuits respectively having active and standby attenuators for controlling an attenuation amount of each output of the active and standby optical transmission circuits; and a coupler combining the outputs of the active and standby attenuators. An output light wavelength of the standby optical transmission circuit is set to a set wavelength different from the output light wavelength of the active optical transmission circuit, and the attenuation amount of the standby attenuator is set to the maximum, and the standby panel is set, and subsequently, the set wavelength of the output light of the standby optical transmission circuit is set to a target wavelength identical to the output light wavelength of the active optical transmission circuit, each having, and a wavelength control method of the light output in the standby system. The problem is solved of the light emitted in a standby system as affecting an active system, while the active system is in operation.

4 Claims, 5 Drawing Sheets

PRIOR ART

FIG. 8

| ITEM NO. | ACTIVE SIDE ITEMS | STANDBY SIDE | | | | | NOTE |
|---|---|---|---|---|---|---|---|
| | | L D | | LN BIAS VOLTAGE | VOA LOSS SETTING | LIGHT OUTPUT (MULTIPLEXER) | |
| | | EMISSION STATE | WAVELENGTH | | | | |
| S1 | SETTING COMPLETED | NO LIGHT EMITTED | SETTING INCOMPLETE | SETTING INCOMPLETE | SETTING INCOMPLETE | W[λ2] ONLY | |
| S2 | | LIGHT EMITTED | SETTING OTHER WAVELENGTH | ← | ← | W[λ2]+ P[λ4](?) | UNDESIRED λ4 OUTPUT MAY OCCUR. |
| S3 | ORDINARY OPERATING STATE | ← | ← | SET | ← | ← | |
| S4 | | ← | ← | SETTING COMPLETED | MAXIMUM ATTENUATION CONTROL & SETTING | λ2 ONLY | |
| S5 | | ← | SET | ← | ← | ← | |
| S6 | | ← | ← | SETTING COMPLETED | REMOVE FIXING & MAXIMUM ATTENUATION CONTROL | ← | |

WDM OPTICAL TRANSMISSION EQUIPMENT WITH REDUNDANT CONFIGURATION, AND WAVELENGTH CONTROL METHOD OF LIGHT OUTPUT IN STANDBY SYSTEM

BACKGROUND OF THE INVENTION

1. Field of the Invention

The present invention relates to wavelength division multiplexing (WDM) optical transmission equipment with redundant configuration, and a wavelength control method of light output in the standby system of the optical transmission equipment.

2. Description of the Related Art

An optical transmission system employing a wavelength division multiplexing (WDM) transmission technique is used for large-capacity communication systems.

The optical transmission system is constituted of WDM optical transmission equipment sets interconnected by optical transmission lines. The WDM optical transmission equipment is constituted of a plurality of optical transmitters outputting optical wavelength signals modulated by the signals from signal sources, and a multiplexer multiplexing the optical wavelength signals having different wavelengths output from the plurality of optical transmitters. The multiplexed signal is then forwarded to a relevant optical transmission line.

To obtain stable operation of the optical transmission system, each set of the optical transmission equipment has a redundant configuration, namely, an active system and a standby system. FIG. 1 is an exemplary configuration of the WDM optical transmission equipment in the optical transmission system.

The plurality of optical transmitters SD1-SD4 respectively outputs optical signals of different optical wavelengths $\lambda 1$-$\lambda 4$. The optical signals of the optical wavelengths $\lambda 1$-$\lambda 4$ output from the plurality of the optical transmitters SD1-SD4 are input to corresponding input ports of a multiplexer 100 (exemplarily structured of an arrayed waveguide grating: AWG), in which the optical signals are wavelength-division-multiplexed. The wavelength-division-multiplexed output is input to an optical amplifier 101, in which the output level therefrom is controlled constant, and amplified. Then the amplified output is forwarded to a non-illustrated optical transmission line.

The plurality of optical transmitters SD1-SD4 are of identical structure. In the lower part of FIG. 1, an enlarged configuration of the optical transmitter SD4 is shown, as one example.

The optical transmitter SD4 has an active system and a standby system, each including an optical transmission circuit 1a (active system), 1b (standby system) having a laser diode of which emission wavelength is controllable (which is termed 'tunable LD') with an electric/optical conversion function, and a variable optical attenuator (VOA) 2a (active system), 2b (standby system) for controlling an attenuation amount against each output. The outputs of variable optical attenuators (VOAs) 2a, 2b are input to a coupler 3, combined and output therefrom.

Here, during operation of the active system, it is necessary to prepare a standby panel and set therein, so that switching to the standby system becomes ready.

Each of the active panel and the standby panel includes corresponding optical transmission circuit 1a, 1b and attenuator 2a, 2b for attenuating the output of optical transmission circuit 1a, 1b.

When resetting the panel on the standby side while the active side is in operation, in order to set the wavelength of the tunable LD into the optical transmission circuit on the standby side to be switched to, and to perform bias setting into the modulator for modulating the wavelength of the tunable LD, it is necessary to emit light once on the standby side.

At this time, in the conventional configuration shown in FIG. 1, optical signals having an identical wavelength $\lambda 4$ are output from optical transmission circuits 1a, 1b on the active side and the standby side, respectively.

In this case, it is necessary to set the attenuation amount in variable optical attenuator (VOA) 2b as maximum against the output of optical transmission circuit 1b on the standby side.

There are broadly two reasons for setting variable optical attenuator (VOA) 2b to the maximum attenuation:

First, in the optical transmitter of the panel on the standby side to be reset, unless the light level input from the standby system to coupler 3 is controlled as small as possible, an optical signal in operation, which is input to coupler 3 from optical transmission circuit 1a and variable optical attenuator (VOA) 2a on the active side, is coupled with the light from the standby system having the identical wavelength. This affects the optical signal in the operation system, and causes deteriorated transmission quality.

Secondly, in FIG. 1, the output of multiplexer 100 is input to optical amplifier 101 in which the output light level is controlled constant by an automatic level control (ALC) function.

More specifically, the optical signals from optical transmission circuits 1a, 1b have the identical light wavelengths $\lambda 4$, and therefore if light is also output from optical transmission circuit 1b in the standby system, the output level of coupler 3 becomes large. Then, because of the ALC function provided in optical amplifier 101, the levels of the components from the other optical transmitters SD1-SD3 are controlled relatively small.

Now, in FIG. 2, detailed configurations of an optical transmission circuit 1a (1b) and a variable optical attenuator (VOA) 2a (2b) are shown.

In optical transmission circuit 1a (1b), the controllable emission wavelength from the laser diode (tunable LD: shown as TN-LD in the figure) 10 is controlled by wavelength controller 11, and the wavelength controlled light output from the tunable LD is output after being modulated in modulator 12 correspondingly to a transmission signal. A bias controller 13 controls a bias voltage against modulator 12, in proportion to the signal level.

Meanwhile, variable optical attenuator (VOA) 2a (2b) includes a current-variable attenuator 20, producing a predetermined attenuation by supplying a reference current from a drive circuit 22. Further, a photodetector 21 senses the output level of coupler 3, and drive circuit 22 controls the drive current based on the sensed output level. In such a way, the attenuation amount of attenuator 20 is controlled constant.

Here, current-variable attenuator 20 has a temperature dependant attenuation property as shown in FIG. 3. In FIG. 3, the horizontal axis represents a current fed from drive circuit 22, while the vertical axis represents a loss amount, i.e. attenuation. A maximum attenuation is obtained at a predetermined current value.

As shown in the figure, the attenuation property varies with the temperature, and therefore the control amount (drive current) to obtain the maximum attenuation also varies with the temperature. As explained earlier, when resetting the standby system, it is necessary to produce the maximum attenuation against the output of optical transmission circuit 1b in the standby system state. However, because the attenuation property varies with the temperature, the precise attenuation property cannot be known, and accordingly, it is difficult to set the drive current which produces the maximum attenuation.

Therefore, in this case, the outputs of other optical transmitters are affected, as explained before.

Here, in the official gazette of the Japanese Unexamined Patent Publication No. 2003-298524, there is disclosed an invention in respect to a startup control method of a laser diode in the WDM technique. However, this invention is aimed to prevent deterioration caused by crosstalk with an adjacent wavelength when starting up the laser diode. There has been no suggestion about solving the difficulty in setting the standby system during operation in the active system.

SUMMARY OF THE INVENTION

Accordingly, it is an object of the present invention to provide wavelength division multiplexing (WDM) optical transmission equipment with redundant configuration, and a wavelength control method for an output optical signal produced in the standby system, which solves a problem that the light emitted in the standby system affects the active system during the operation performed by the active system.

As an aspect of an optical transmitter according to the present invention to achieve the aforementioned object, the optical transmitter includes: active and standby panels respectively having active and standby optical transmission circuits, and active and standby attenuators for controlling an attenuation amount of each output of the active and standby optical transmission circuits; and a coupler combining the outputs of the active and standby attenuators. An output light wavelength of the standby optical transmission circuit is set to a set wavelength different from the output light wavelength of the active optical transmission circuit, and the attenuation amount of the standby attenuator is set to the maximum, and the standby panel is set accordingly. Subsequently, the set wavelength of the output light of the standby optical transmission circuit is set to a target wavelength identical to the output light wavelength of the active optical transmission circuit.

As a first aspect of WDM optical equipment according to the present invention to achieve the aforementioned object, the WDM optical equipment includes: a plurality of optical transmitters outputting optical signals of mutually different wavelengths; and a multiplexer inputting the light output from the plurality of optical transmitters into ports of the corresponding wavelengths, and multiplexing the light. Each of the plurality of optical transmitters includes: active and standby panels respectively having active and standby optical transmission circuits, and active and standby attenuators for controlling an attenuation amount of each output of the active and standby optical transmission circuits; and a coupler combining the outputs of the active and standby attenuators. An output light wavelength of the standby optical transmission circuit is set to a set wavelength different from the output light wavelength of the active optical transmission circuit, and the attenuation amount of the standby attenuator is set to the maximum, and the standby panel is set accordingly. Subsequently, the set wavelength of the output light of the standby optical transmission circuit is set to a target wavelength identical to the output light wavelength of the active optical transmission circuit.

As a second aspect of the WDM optical equipment according to the present invention, in the first aspect, the WDM optical equipment further includes an optical amplifier controlling to maintain the multiplexer output to a constant level.

As a third aspect of the WDM optical equipment according to the present invention, the WDM optical equipment includes: a plurality of optical transmitters outputting optical signals of mutually different wavelengths; a multiplexer inputting the light output from the plurality of optical transmitters into ports of the corresponding wavelengths, and multiplexing the light; and an optical amplifier controlling to maintain the multiplexer output to a constant level. Each of the plurality of optical transmitters includes: active and standby panels respectively having active and standby optical transmission circuits, and active and standby attenuators for controlling an attenuation amount of each output of the active and standby optical transmission circuits; and a coupler combining the outputs of the active and standby attenuators. An output light wavelength of the standby optical transmission circuit is set to a wavelength different from the output light wavelength of the active optical transmission circuit, and the attenuation amount of the standby attenuator is set to the maximum. Subsequently, the set wavelength of the output light of the standby optical transmission circuit is set to a target wavelength identical to the output light wavelength of the active optical transmission circuit, and the standby panel is set.

Further, as a fourth aspect of the WDM optical equipment according to the present invention, in the second or third aspect, the active and standby optical transmission circuits include laser diodes having characteristics such that the emission wavelengths vary with the temperature. When controlling the attenuation amount of the attenuator in the standby optical transmission circuit to the maximum, the laser diode in the standby optical transmission circuit is either heated or cooled so as to enable the laser diode to output the set wavelength in the wavelength direction opposite to the output light wavelength of the corresponding active optical transmission circuit.

Still further, as a fifth aspect of the WDM optical equipment according to the present invention, in the third or fourth aspect, the attenuator is a current-controlled variable attenuator.

As a first aspect of a panel setting method for the standby system in the WDM optical equipment according to the present invention, the panel setting method is provided in WDM optical equipment having a plurality of optical transmitters outputting optical signals of mutually different wavelengths, and a multiplexer inputting the light output from the plurality of optical transmitters into ports of the corresponding wavelengths and multiplexing the light. Here, each of the plurality of optical transmitters includes: active and standby panels respectively having active and standby optical transmission circuits, and active and standby attenuators for controlling an attenuation amount of each output of the active and standby optical transmission circuits; and a coupler combining the outputs of the active and standby attenuators.

The panel setting method for setting the standby system includes the steps of: setting an output light wavelength of the standby optical transmission circuit to a wavelength different from the output light wavelength of the active optical transmission circuit; setting the attenuation amount of the standby attenuator to the maximum; setting the standby panel; and subsequently, setting the output light wavelength of the standby optical transmission circuit to a target wavelength identical to the output light wavelength of the active optical transmission circuit.

As a second aspect of a panel setting method for the standby system in the WDM optical equipment according to the present invention, an optical amplifier controls to maintain the multiplexer output to a constant level.

Further, as a third aspect of a panel setting method for the standby system in the WDM optical equipment according to the present invention, the method is provided in WDM optical equipment having a plurality of optical transmitters outputting optical signals of mutually different wavelengths, a multiplexer inputting the light output from the plurality of optical transmitters into ports of the corresponding wavelengths and multiplexing the light, and an optical amplifier which controls the gain of the multiplexer output to a constant level. Each of the plurality of optical transmitters includes: active and standby panels respectively having active and standby optical transmission circuits, and active and standby attenuators for controlling an attenuation amount of each output of the active and standby optical transmission circuits; and a coupler combining the outputs of the active and standby attenuators. The panel setting method for the standby system includes the steps of: setting an output light wavelength of the standby optical transmission circuit to a wavelength different from the output light wavelength of the active optical transmission circuit; setting the attenuation amount of the standby attenuator to the maximum; subsequently, setting the output light wavelength of the standby optical transmission circuit to a target wavelength identical to the output light wavelength of the active optical transmission circuit; and setting the standby panel.

Still further, as a first aspect of a panel setting method for the standby system in the WDM optical equipment according to the present invention, the active and standby optical transmission circuits include laser diodes having characteristics such that the emission wavelengths vary with the temperature. When controlling the attenuation amount of the attenuator in the standby optical transmission circuit to the maximum, the laser diode in the standby optical transmission circuit is either heated or cooled so as to enable the laser diode to output the set wavelength in the wavelength direction opposite to the output light wavelength of the corresponding active optical transmission circuit.

Further scopes and features of the present invention will become more apparent by the following description of the embodiments with the accompanied drawings.

BRIEF DESCRIPTION OF THE DRAWINGS

FIG. 8 shows a diagram representing the states of each portion in each step shown in FIG. 7.

DETAILED DESCRIPTION OF THE INVENTION

The preferred embodiment of the present invention is described hereinafter referring to the charts and drawings. However, it is to be noted that the scope of the present invention is not limited to the embodiments described below.

Figure 4:
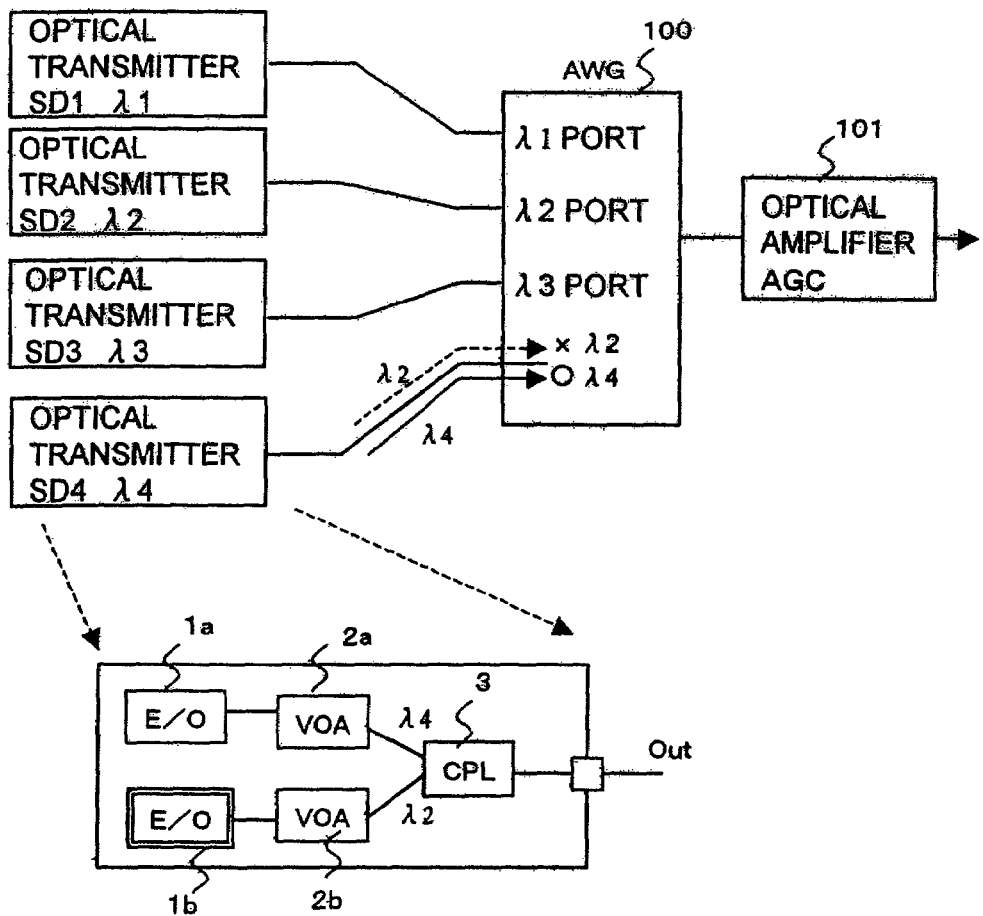
FIG. 4 shows a diagram illustrating an exemplary configuration of WDM optical transmission equipment according to the present invention.
Figure 5:
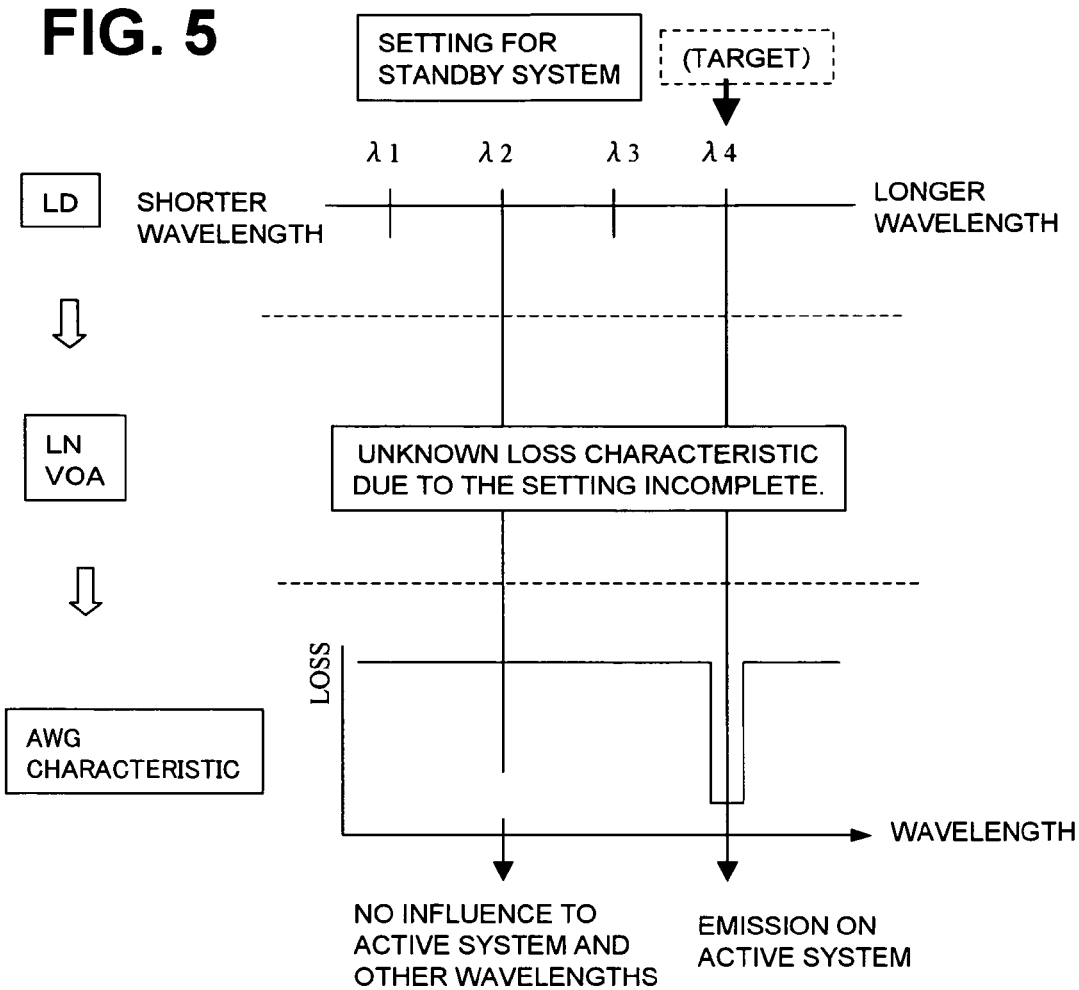
FIG. 5 shows an explanation diagram illustrating a setting principle of the standby system shown in FIG. 4.

FIG. 4 is an exemplary configuration of wavelength division multiplexing (WDM) optical transmission equipment according to the present invention. Also, FIG. 5 is an explanation diagram illustrating a setting principle of the standby system of the optical transmission equipment shown in FIG. 4.

Now, in FIG. 4, it is assumed that one system (active system) of the transmitter SD4 is in an operating state, and that setting of the panel in the other (standby) system is to be performed.

The basic principle of the present invention is that, when the active light output from the optical transmitter SD4 has a wavelength $\lambda 4$, first, the wavelength of the output light from optical transmission circuit $1b$ in the standby system is to be set to a wavelength $\lambda 2$, which is different from $\lambda 4$.

In this figure, it is shown that the optical transmitter SD2 also has a wavelength $\lambda 2$. However, the output wavelength of the standby system of the optical transmitter SD4 is only required to be different from the output wavelength of the active system $\lambda 4$. It is not necessary for the standby system to have the output wavelength consistent with an output wavelength of the other optical transmitters (such as SD2).

At this time, both an optical signal having a wavelength $\lambda 4$ output from optical transmission circuit $1a$ in the active system and an optical signal having a wavelength $\lambda 2$ output from optical transmission circuit $1b$ in the standby system are input to coupler 3.

In this state, because variable optical attenuator (VOA) $2b$ in the standby system is not always controlled to have the maximum attenuation amount, as described earlier. Therefore, there are cases that light output of a certain level is input from optical transmission circuit $1b$ to coupler 3.

However, since the output wavelength of the standby system is different, no influence is produced to the optical signal, having the wavelength $\lambda 4$, in the active system under operation.

Then, the optical signal of wavelength $\lambda 4$ combined with the optical signal of wavelength $\lambda 2$ is input to the corresponding input port of multiplexer 100.

Here, multiplexer 100 has a plurality of input ports, each input port selectively extracting light having a certain wavelength, defined port by port, from the input light. Multiplexer 100 multiplexes, and outputs, the extracted light. Multiplex 100 is, for example, constituted of an arrayed waveguide grating (AWG).

Accordingly, the output light from optical transmitter SD4, in which the optical signal of wavelengths $\lambda 4$ is combined with the optical signal of wavelength $\lambda 2$, is input to the corresponding input port of multiplexer 100, but the optical signal of wavelength $\lambda 2$ cannot be transmitted (multiplexed). The reason is that each input port of multiplexer 100 has a filtering function provided with a sharp selectivity against the corresponding wavelength. With this function, there is no influence produced on the other optical transmission circuits.

Next, the attenuation of variable optical attenuator (VOA) $2b$ is set to the maximum.

Figure 1:
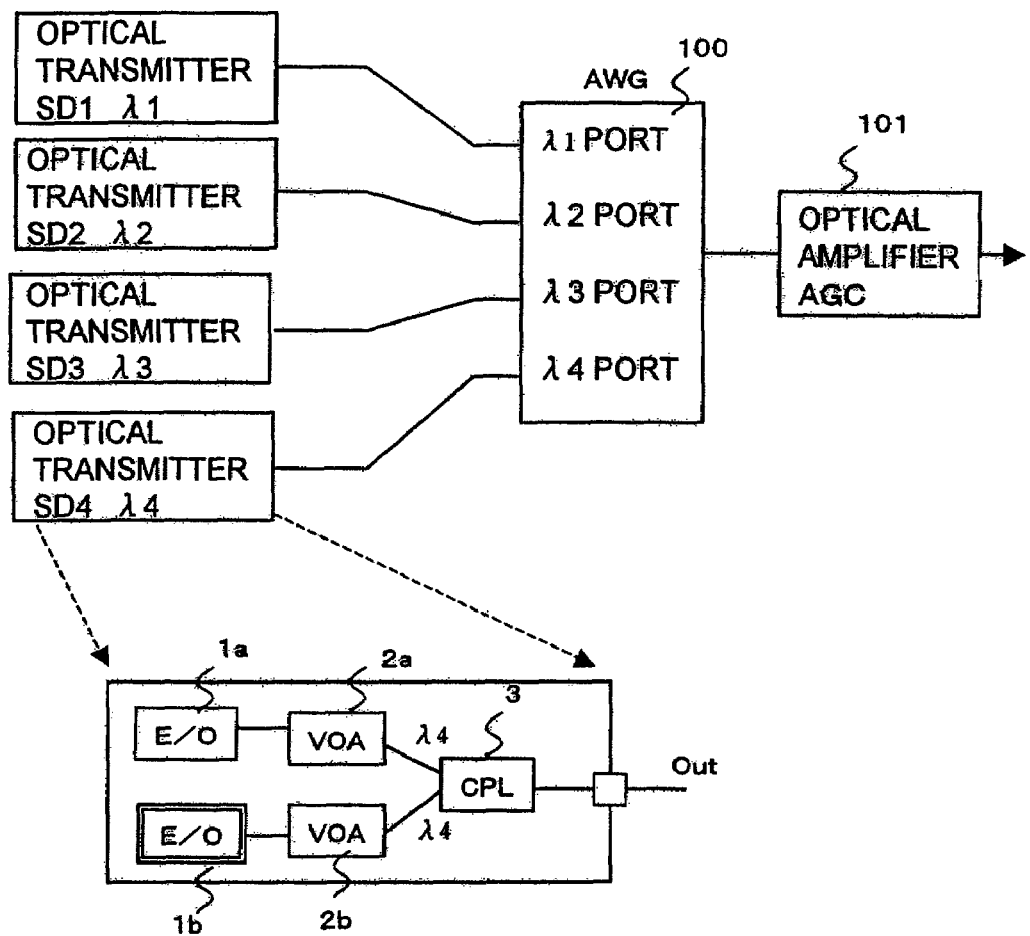
FIG. 1 shows a diagram illustrating an exemplary configuration of wavelength division multiplexing (WDM) optical transmission equipment in an optical transmission system.
Figure 2:
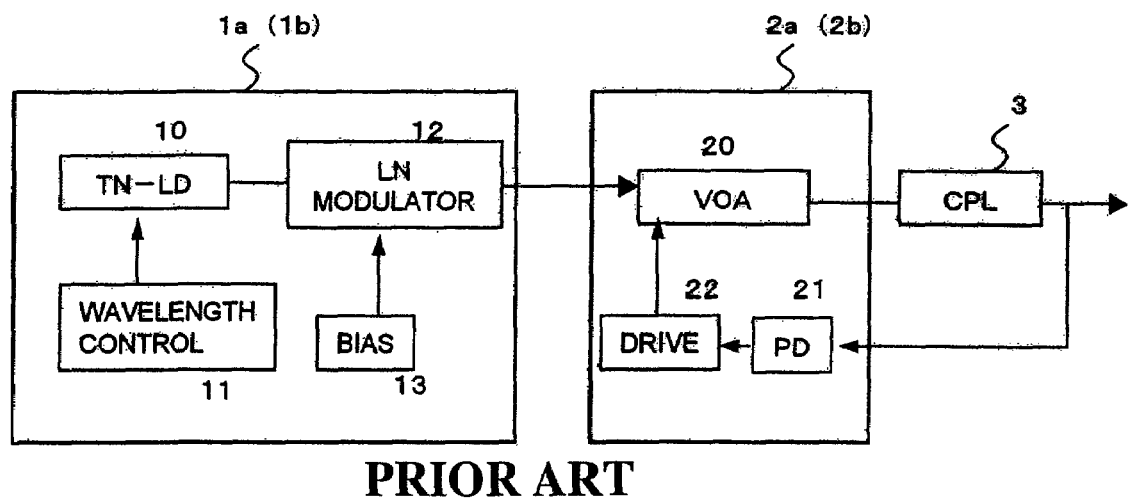
FIG. 2 shows a diagram illustrating detailed configurations of an optical transmission circuit 1a (1b) and a variable optical attenuator (VOA) 2a (2b).
Figure 3:
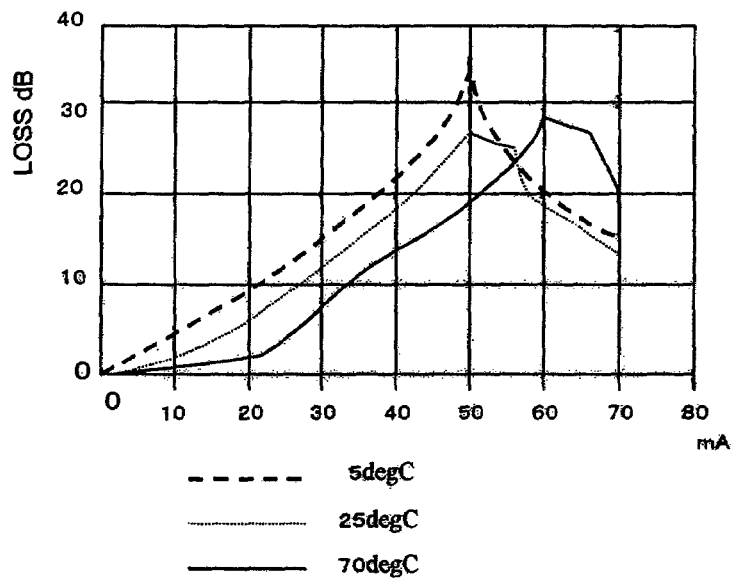
FIG. 3 shows a diagram illustrating a temperature dependant attenuation property of a current-variable attenuator.

More specifically, in FIG. 2, the output of coupler 3 is monitored by photodetector 21, and drive circuit 22 controls attenuator 20 in such a way that the light reception level becomes a minimum.

Then the setting in the panel of the standby system is performed, which includes, for example, bias setting of the modulator for modulating the wavelength of the tunable LD.

Subsequently, the output wavelength of optical transmission circuit 1b is changed.

More specifically, in FIG. 2, the output of tunable LD 10 is controlled to have the wavelength λ4, by means of a wavelength controller 11.

Thus, the output wavelengths of optical transmission circuits 1a, 1b in the active system and the standby system become the same wavelength λ4. Here, since the attenuation of variable optical attenuator (VOA) 2b, to which the output of optical transmission circuit 1b is input, has been set to the maximum, it becomes possible to switch over to the standby panel of transmitter SD4 without affecting the other transmitters.

FIG. 5 is a diagram explaining the effect of the present invention, when the variable optical attenuator (VOA) is not set yet and the attenuation property of the VOA against the temperature is not known.

As shown in FIG. 5, according to the present invention, the wavelength λ2, which is different from the wavelength λ4 in the active system, is set in the standby system. The AWG is an optical means which has a plurality of input ports, selectively extracts the light having each certain wavelength from among the light input thereto, and multiplexes and outputs the extracted light. Accordingly, each AWG input port has a filtering function having a sharp selectivity against the corresponding wavelength only. In FIG. 5, a particular wavelength λ4 is selected and transmitted, while other wavelengths including λ2 is not selected and a great loss is produced. Thus, the light having the wavelength λ2 in the standby system does not affect the active system. Also, because of the above characteristic of the AWG, no influence is produced upon the outputs of the other optical transmission circuits.

Figure 6:
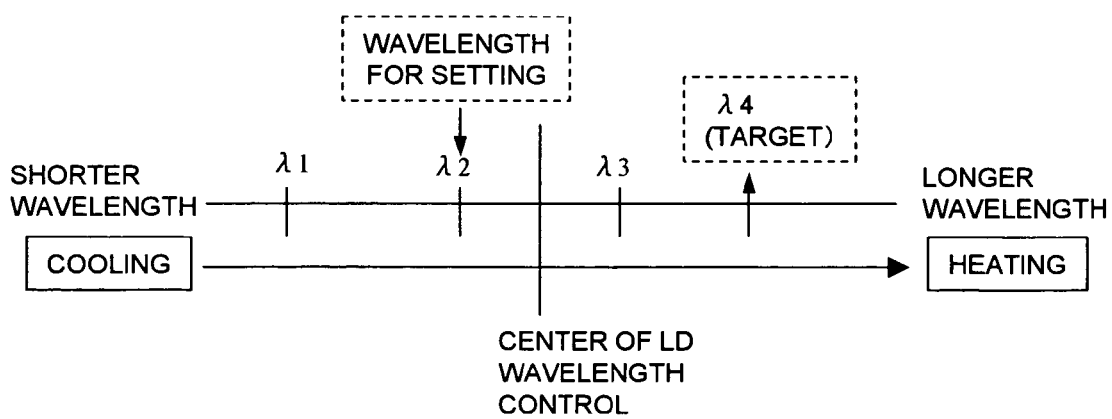
FIG. 6 shows a flowchart illustrating a processing method for the setting principle shown in FIG. 5.

FIG. 6 is a diagram illustrating a wavelength control method of the tunable LD in the standby system according to the present invention.

Here, the wavelength of the tunable LD is settable (controllable) from the wavelength λ1 on the shorter wavelength side to the wavelength λ4 on the longer wavelength side by controlling the temperature of the tunable LD. The system is assumed to use the wavelengths λ1, λ2, λ3 and λ4 in the above wavelength bandwidth.

As described above, in the tunable LD of the standby system, the emission wavelength is set differently (no crosstalk produced) from the target wavelength, i.e. the wavelength in use. Namely, in FIG. 6, since a set wavelength of the tunable LD in the standby system is controlled by a set temperature, the temperature to be set is controlled in the opposite direction to the final target wavelength (temperature), so that the wavelength in the standby system becomes different from the wavelength in the active system.

More specifically, for example, at the time of turning on the power of the tunable LD in the standby system, when dividing the settable wavelength range of the tunable LD into two wavelength sides by the center of the range determined by the temperature of that time, 1) if the target wavelength (for the active system) lies on the shorter wavelength side, then the tunable LD is heated so as to emit light on the longer wavelength side, and
2) if the target wavelength (for the active system) lies on the longer wavelength side, then the tunable LD is cooled so as to emit light on the shorter wavelength side.

In the example shown in FIG. 6, since the target wavelength λ4 lies on the longer wavelength side, the tunable LD is cooled and controlled to output the set wavelength λ2.

Figure 7:
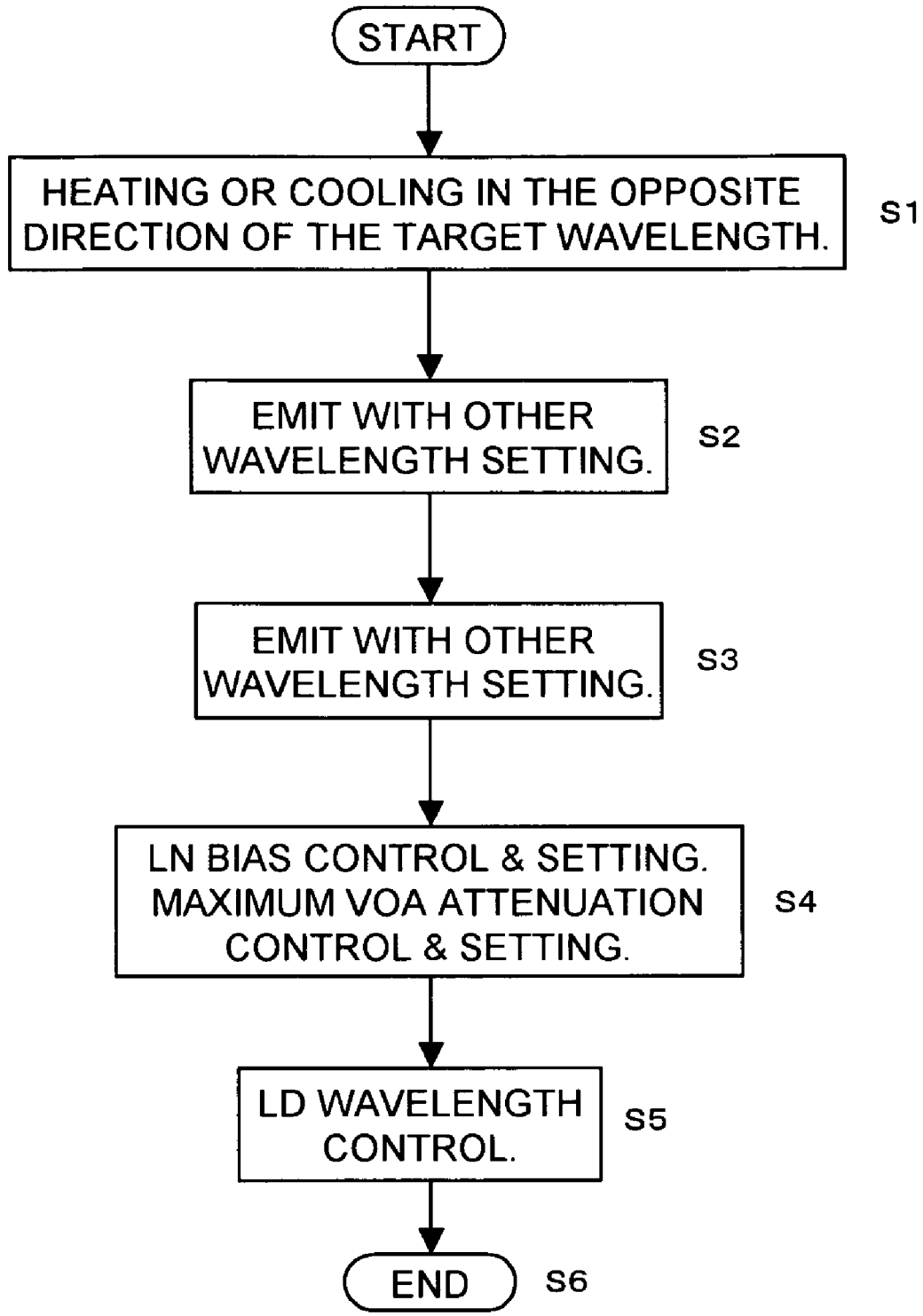
FIG. 7 shows an operation flowchart for setting the standby system in WDM optical transmission equipment according to the present invention.

FIG. 7 is an operation flowchart illustrating each control procedure with respect to the present invention, which includes an example of wavelength setting in a tunable LD of the standby system. Also, FIG. 8 is a table representing the states of each portion of the WDM optical equipment shown in FIG. 4, corresponding to the flow shown in FIG. 7.

In the above example, the target wavelength λ4 of the optical transmitter SD4 in operation is located on the longer wavelength side against the center position of the settable wavelength range of the tunable LD. Therefore, the tunable LD in the standby system, in which setting a different wavelength is required, is cooled so as to emit light of a lower wavelength, for example, the wavelength λ2 (step S1 in FIG. 7). With this, the wavelength being apart further from the target wavelength λ4 can be obtained (step S2). Thus, in coupler 3, the wavelength, which is different from the target wavelength λ4 in operation in the active system, is set, and as a result, crosstalk with the wavelength λ4 can be prevented.

The light having the wavelength λ2 set in the above manner is emitted from tunable LD in the standby system (step S3). Next, necessary initial settings in the standby system including, for example, the bias setting of the tunable LD of the standby system are performed. Also, the attenuation in variable optical attenuator (VOA) 2b of the standby system is set to the maximum (step S4).

On completion of the necessary setting in the standby system, the wavelength of the tunable LD in optical transmission circuit 1b of the standby system is set to the target wavelength λ4 (step S5). Thus, the standby system becomes a stable state in which the setting is completed (step S6).

At this time, the attenuation of variable optical attenuator (VOA) 2b in the standby system has been set to the maximum amount, by which the input level to coupler 3 becomes the minimum, and no influence is produced on the optical signal of the wavelength λ4 in operation.

In the above process, during the period from the time optical transmission circuit 1b on the standby side starts light output to the time variable optical attenuator (VOA) 2b on the standby side is controlled to the maximum attenuation, the light output from optical transmission circuit 1b on the standby side is also input into a predetermined port of multiplexer 100, via coupler 3.

The wavelength λ2 output from optical transmission circuit 1b in the standby system during the above period is different from the wavelength λ4 selected in multiplexer 100. Therefore, this output from optical transmission circuit 1b is not multiplexed in multiplexer 100. Namely, only the optical signal in operation, which is output from optical transmission circuit 1a in the active system, is multiplexed. Accordingly, the output light level multiplexed with the output wavelengths from the other optical transmitters SD1-SD3 is not affected by the light level from optical transmission circuit 1b in the standby system of optical transmitter SD4. Although the ALC control is functioning in optical amplifier 101, the levels of the other wavelengths λ1, λ2 and λ3 are not affected. Thus, a satisfactory transmission characteristic can be obtained.

In the above description, as an embodiment of the present invention, the WDM equipment having a plurality of optical transmitters has been explained. However, considering the first reason for setting the attenuator to the maximum attenuation as explained before, the present invention can be applied to a single optical transmitter having transmission circuit panels for the active system and the standby system.

To summarize, according to the present invention, it is possible to provide WDM optical transmission equipment having redundant configuration without affecting the active system when resetting in the standby system. Also, influences to the other wavelengths are avoidable.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. WDM optical equipment comprising:
   a plurality of optical transmitters outputting optical signals having different wavelengths, respectively; and
   a multiplexer inputting the optical signals output from the plurality of optical transmitters into ports of the corresponding wavelengths, and multiplexing the optical signals,
   each of the plurality of optical transmitters including;
      active and standby panels respectively having active and standby optical transmission circuit, and active and standby attenuators respectively controlling an attenuation amount of each output of the active and standby optical transmission circuits; and
      a coupler combining the outputs of the active and standby attenuators,
   wherein when the standby panel is reset during the active panel being in operation the standby optical transmission circuit is set to output an optical signal having a wavelength different from a wavelength of an optical signal output from the active optical transmission circuit, and an attenuation amount of the standby attenuator is set to the maximum, and subsequently, the wavelength of the optical signal output of the standby optical transmission circuit is set to a target wavelength identical to the wavelength of the optical signal output from the active optical transmission circuit; and
   an optical amplifier controlling to maintain a level of the optical signals multiplexed by the multiplexer to be constant,
   wherein the active and standby optical transmission circuits include laser diodes having characteristics such that wavelengths of optical signals emitted from the laser diodes vary with the temperature, and
   when controlling the attenuation amount of the attenuator in the standby optical transmission circuit to the maximum, the laser diode in the standby optical transmission circuit is either heated or cooled so as to enable the laser diode to output an optical signal having a wavelength in an opposite direction relative to the center of the wavelength control range determined by the temperature at time of resetting, to the wavelength of the optical signal output from the corresponding active optical transmission circuit so as to output the optical signal of the target wavelength.

2. The WDM optical equipment according to claim 1, wherein the attenuator is a current-controlled variable attenuator.

3. A method of resetting a standby panel in WDM optical equipment having a plurality of optical transmitters outputting optical signals having different wavelengths, respectively, and a multiplexer inputting the optical signals output from the plurality of optical transmitters into ports of the corresponding wavelengths and multiplexing the optical signals, and each of the plurality of optical transmitters having active and standby panels respectively having active and standby optical transmission circuits, and active and standby attenuators respectively controlling an attenuation amount of each output of the active and standby optical transmission circuits, a coupler combining the outputs of the active and standby attenuators,
   the method of the resetting of the standby panel in the WDM optical equipment comprising:
   during the active panel being in operation,
   setting the standby optical transmission circuit to output an optical signal having a wavelength different from a wavelength of an optical signal output from the active optical transmission circuit;
   setting an attenuation amount of the standby attenuator to the maximum; and subsequently, setting the wavelength of the optical signal output from the standby optical transmission circuit to a target wavelength identical to the wavelength of the optical signal output from the active optical transmission circuit,
   wherein the active and standby optical transmission circuits include laser diodes having characteristics such that wavelengths of optical signals emitted from the laser diodes vary with the temperature, and
   when controlling the attenuation amount of the attenuator in the standby optical transmission circuit to the maximum, the laser diode in the standby optical transmission circuit is either heated or cooled so as to enable the laser diode to output an optical signal having a wavelength in the opposite direction relative to the center of the wavelength control range determined by the temperature at the time of resetting to the wavelength of the optical signal output from the corresponding active optical transmission circuit so as to output the optical signal of the target wavelength.

4. The method of resetting the standby panel in the WDM optical equipment according to claim 3,
   further comprising the step of controlling an optical amplifier to maintain the optical signals multiplexed by the multiplexer to a constant level.

* * * * *